United States Patent
Patrick et al.

[11] Patent Number: 5,632,382
[45] Date of Patent: May 27, 1997

[54] HEAVY LIQUID FOR MATERIAL SEPARATIONS

[76] Inventors: Jennifer M. Patrick; Vincent A. Patrick, both of 11 Granadilla Street, Duncraig, Western Australia 6023, Australia

[21] Appl. No.: 313,172
[22] PCT Filed: Apr. 7, 1993
[86] PCT No.: PCT/AU93/00151
§ 371 Date: Jan. 18, 1995
§ 102(e) Date: Jan. 18, 1995
[87] PCT Pub. No.: WO93/19849
PCT Pub. Date: Oct. 14, 1993

[30] Foreign Application Priority Data

Apr. 7, 1992 [AU] Australia .................. PL 1764

[51] Int. Cl.$^6$ .................................. B03B 5/60
[52] U.S. Cl. .............. 209/173; 209/172.5; 252/60; 252/61
[58] Field of Search .................... 423/592, 606, 423/326; 252/60, 61; 209/173, 172.5

[56] References Cited

U.S. PATENT DOCUMENTS

| | | | |
|---|---|---|---|
| 3,857,929 | 12/1974 | Quatrini et al. | 423/593 |
| 4,272,400 | 6/1981 | Silbernagel et al. | 252/413 |
| 4,557,718 | 12/1985 | Kamps et al. | 494/37 |
| 4,612,180 | 9/1986 | Kim et al. | 423/593 |
| 4,916,101 | 4/1990 | Lyons et al. | 502/209 |

FOREIGN PATENT DOCUMENTS

| | | |
|---|---|---|
| 84324 | 3/1977 | Australia . |
| 87103660 | 11/1988 | China . |
| 1267585 | 3/1972 | United Kingdom . |

OTHER PUBLICATIONS

Derwent Abstract Accession No. 89-332691/46, 8703660 (Jielin Prov Inst ME) 30 Nov. 1988.
Derwent Abstract Accession No. 87-324418/46, 2230619 (polytronics KK) 09 Oct. 1987.

*Primary Examiner*—Deborah Jones
*Assistant Examiner*—Amy M. Harding
*Attorney, Agent, or Firm*—Schwegman, Lundberg, Woessner & Kluth, P.A.

[57] ABSTRACT

A dense or heavy liquid for material separations comprising an aqueous solution including a salt having anionic moieties having the formula $[(a)^{n+}(b)_m O_k]^{x-}$ where (a) is selected from group IV elements, group V elements, transition metal elements, and rare earth elements; (b) is one or more transition metal elements having an atomic weight between 50 and 201 inclusive, where O is oxygen, where m is an integer between 6 and 18 inclusive, and where k is an integer between 24 and 62 inclusive, said dense liquid also comprising in said aqueous solution cationic moieties capable of forming said salt of said anionic moieties. The cation values may be lithium, sodium, or a mix thereof, with a small amount of hydrogen cations provided by free acid anionic moieties. The most preferred anionic moiety is $[SiW_{12}O_{40}]^{4-}$. The atom designated (b) alternatively may be molybdenum, vanadium, niobium or tantalum.

20 Claims, No Drawings

HEAVY LIQUID FOR MATERIAL SEPARATIONS

This invention relates to the field of heavy liquids, and in particular, heavy liquids having application in the fields of mineral and other material separations.

Many mineral and mining companies have a need to determine how much of their ore or mineral product is a "heavy" mineral, since the heavy minerals often are the valuable component of the ore. This requires a separation of the heavy components from the light components such as silica, which have a density usually less than 2.7 g/cc.

Current practice is to use either bromoform, or 1,1,2,2-tetrabromoethane (commonly known as and hereinafter referred to as TBE) to effect the mineral separation. Bromoform has a density of 2.87 g/cc and TBE has a density of 2.95 g/cc. However, both of these compounds have been shown to have adverse effects on the health of humans exposed to them, and there is pressure both from within the mineral industry and externally to replace these toxic substances with a safer heavy liquid.

Most mineral companies using either TBE or bromoform require a heavy liquid with a density in excess of 2.80 g/cc at room temperature. Another requirement is that the heavy liquid be not significantly more viscous than TBE. Bromoform (2 cP) (centipoise) is twice as viscous as water, and TBE (10 cP) has about ten times the viscosity of water. The time to achieve an effective mineral separation in the liquid increases in direct proportion to viscosity, because the movement of particles in the liquid is slowed down.

A low-toxicity substitute for bromoform and TBE is already available, and is known as SPT (actually sodium metatungstate, but commonly known as sodium polytungstate). This is an inorganic compound, having the chemical formula $Na_6[H_2W_{12}O_{40}]$ in anhydrous form, which is dissolved in water to form very dense solutions. SPT has not been readily accepted by those users who need a heavy liquid with a density of 2.8 g/cc or more, because its solutions at these densities are too viscous at >28 cP, or more than 28 times the viscosity of water. Another disadvantage of SPT is its lack of thermal stability above 60 degrees Celsius.

Sodium metatungstate is a salt of metatungstic acid. Metatungstic acid is a metatungstate ($[H_2W_{12}O_{40}]^{6-}$) and is one of a family of compounds known as the isopolytungstates. Isopolytungstates also include paratungstate-A ($[W_7O_{24}]^{6-}$), and paratungstate-B ($[W_{12}O_{41}]^{10-}$).

Isopolytungstates are themselves, from one group of tungsten polyacids. The number of different types of tungsten polyacids is large. They are conveniently divided into heteropoly and isopoly acids, where the isopoly acids are those containing only tungsten, oxygen and hydrogen, and the heteropoly acids are those containing one or two other elements in addition to tungsten, oxygen and hydrogen.

Heteropolytungstic acids are more numerous, and include species such as $[X^{n+}W_{12}O_{40}]^{(8-n)-}$, $[X^{n+}W_{11}O_{39}]^{(12-n)-}$, $[X_2^{n+}W_{18}O_{62}]^{(16-2n)-}$, and $[X^{n+}W_6O_{24}]^{(12-n)-}$.

For each of these species, $X^{n+}$ represents a positively charged hetero element. For the species $[X^{n+}W_{12}O_{40}]^{(8-n)-}$, it is known that X may represent phosphorus, arsenic, boron, silicon, germanium, zirconium, titanium, iron, zinc, cobalt, nickel, copper, other transition metal elements, and rare earth elements.

It is also possible to prepare mixed isopoly or heteropoly acids, where another element may substitute for a tungsten atom. An example of this is $[SiMoW_{11}O_{40}]^{4-}$, in which a single tungsten is replaced by a molybdenum atom.

Even for tungsten heteropolyanions which have a single formula, e.g. $[SiW_{12}O_{40}]^{4-}$, there can be several isomers in which the spatial configuration of the tungsten atoms differ. Tungstosilicic acid has two relatively stable and well characterised forms, the alpha- and the beta- forms.

The alpha- form is the more common and is the only form available commercially. The beta- form is less thermally stable and decomposes slowly even at room temperature.

Both the alpha- and the beta- forms of tungstosilicic acid can be used to form heavy liquid solutions. In fact the beta-form yields a higher density lower viscosity heavy liquid than the alpha- form of tungstosilicic acid.

The property of the heteropolytungstic acids being able to form heavy solutions is recognised in the literature. There are however, a very large number of such compounds, and not all form heavy solutions or have the required low viscosity. For example, silico-tungstic acid, which is also known as alpha-tungstosilicic acid will form a heavy liquid in aqueous solution, but due to its corrosive nature and its instability, it is not suitable for use in mineral separations. The maximum density of an aqueous solution of alpha-tungstosilicic acid is about 2.84 g/cc at 18° C.

It is an object of this invention to provide a heavy liquid replacement for bromoform and other heavy liquids, which will obviate the aforementioned disadvantages, or at least provide a useful alternative.

In accordance with one aspect of the present invention there is provided a stable dense liquid for material separations, said dense liquid comprising an aqueous solution including a salt having anionic moieties having the formula $[(a)^{n+}(b)_mO_k]^{x-}$ where (a) is selected from the following:

group IV elements group V elements transition metal elements rare earth elements;

where (b) is one or more transition metal elements having an atomic weight between 50 and 201 inclusive, where 0 is oxygen, where m is an integer between 6 and 18 inclusive, and where k is an integer between 24 and 62 inclusive;

said dense liquid also comprising in said aqueous solution cationic moieties capable of forming said salt of said anionic moieties.

Preferably said cationic moieties comprise lithium or sodium values, or a mix thereof.

Preferably said stable dense liquid comprises a minor portion of a free acid form of said anionic moieties.

Preferably said atomic weight is between 92 and 201 inclusive.

Preferably (a) is silicon.

Preferably (b) is one of tungsten, molybdenum, vanadium, niobium or tantalum.

Preferably said anionic moieties comprise $[SiW_{12}O_{40}]^{4-}$.

In accordance with a second aspect of the invention there is provided a heavy liquid for material separations comprising a solution of one or more salts of a heteropoly tungstic acid, wherein said heteropolytungstic acid has the formula $H_4XW_{12}O_{40}$ where X is an element selected from the following:

group IV elements group V elements transition metal elements rare earth elements Preferably one of said one or more salts is a lithium salt of said acid.

Preferably another of said salts is a sodium salt of said acid.

Preferably said one or more salts contains both lithium values and sodium values.

Preferably said solution comprises between 0.005% and 2.5% of a free acid in the form of said heteropoly tungsten acid.

Preferably said solution comprises 0.2% of said free acid.

Preferably X is silicon.

Preferably said heteropolytungstic acid is alpha-tungstosilicic acid.

In accordance with a third aspect of the present invention there is provided a dense liquid for material separations, said dense liquid comprising an aqueous solution of a salt having the formula $(X)_n{}^{m+}(SiW_{12}O_{40})^{4-}$ where X is a cationic moiety.

Preferably said cationic moiety comprises lithium or sodium or a mix thereof.

Preferably said cationic moiety includes between 0.005% and 2.5% hydrogen cations.

Preferably said cationic moiety includes about 0.2% hydrogen cations.

In accordance with a fourth aspect of the present invention there is provided a method of preparing a compound for use as a dense solution for material separations comprising slowly admixing an aqueous alkaline solution of cations selected from the group comprising lithium, sodium, or a mixture of lithium and sodium to a solution of alpha-tungstosilicic acid, preferably with agitation, until the pH of the solution reaches between 1 and 4, and evaporating excess water from the resultant product to produce said dense solution or said compound.

The dense solution may be further evaporated to produce a crystalline product which may be used to form a dense solution by dissolving the same in water.

Preferably said aqueous alkaline solution is added to said solution of alpha-tungstosilicic acid until the pH reaches between 2 and 4.

Preferably said aqueous alkaline solution is added to said solution of alpha-tungstosilicic acid until the pH reaches 3.5.

In accordance with a fifth aspect of the present invention there is provided a method of separating heavy material from light material comprising adding an admixture of said heavy material and said light material to a heavy or a dense liquid as hereinbefore defined, said heavy or dense liquid having a density greater than the density of said light material, and less than the density of said heavy material; allowing said admixture to settle, and separately collecting said heavy material and said light material therefrom.

DESCRIPTION OF THE PREFERRED EMBODIMENT

The most preferred form of the invention resides in a heavy liquid comprising an aqueous solution of lithium and/or sodium salts of tungstosilicic acid. These salts form heavy aqueous solutions with exceptional properties, having a good compromise of density, viscosity and stability, when considered in relation to sodium metatungstate. In addition, these solutions exhibit low toxicity.

The lithium and sodium alpha-tungstosilicates, or mixes thereof with the Li:Na ratio varying depending upon the application, are those having the anion species $[SiW_{12}O_{40}]^{4-}$. In the case where mixes of lithium and sodium cation salts are formed, the molar Li/Na ratio will be dependent upon the ratio of lithium and sodium cations available to the anion species.

Sodium alpha-tungstosilicate forms an aqueous solution having a maximum possible density of 2.74 g/cc at 20 degrees Celsius; however the solubility of the sodium salt is temperature dependent, the solubility and therefore the maximum attainable density increasing with increasing temperature. At temperatures in excess of 25 degrees Celsius, the solubility of the sodium salt is increased to the extent that the resultant solution reaches the required density of 2.8 g/cc to be suitable for use in mineral separations of the type as hereinbefore described.

The lithium alpha-tungstosilicate forms an aqueous solution having a maximum possible density of 2.96 g/cc at 25 degrees Celsius. The solubility of the lithium salt is not as temperature dependent as the sodium salt, with the consequence that the solubility of the lithium salt and therefore the maximum attainable density does not decrease as markedly with falling temperature as is the case with the sodium salt.

In the case where there is a mix of lithium and sodium cations available to the alpha-tungstosilicate polyanion, the solubility of the salt and hence the maximum possible density which may be achieved in aqueous solution, is dependent on the ratio of lithium to sodium cations. At 20 degrees Celsius the maximum achievable density will decrease from 2.90 g/cc to 2.74 g/cc with increasing sodium cations in the ratio. To achieve a density of 2.8 g/cc at 20 degrees Celsius the Li:Na ratio will be greater than 0.2.

The molecular formula of the lithium form, not indicating water of hydration, is $Li_4[SiW_{12}O_{40}]$. The IUPAC name for this compound is tetralithium 1.4, 1.9, 2.5, 2.6, 3.7, 3.8, 4.10, 5.10, 6.11, 7.11, 8.12, 9.12, -dodeca-μ-oxo-$μ_{12}$-(tetraoxosilicato-$O_{1.4.9}$, -$O_{2.5.6}$, $O_{3.7.8}$, $O_{10.11.12}$) -tetrakis [tri-μ-oxo-tri-(oxotungstate)]. In the chemical literature, this and other similar $XW_{12}O_{40}{}^{n-}$ species (where X can be a range of suitable elements) are commonly known as Keggin species.

Aqueous solutions of lithium or lithium/sodium alpha-tungstosilicate (hereinafter referred to as "LST") form dense liquids which can be used to replace the toxic organic heavy liquids bromoform and TBE. Depending on the temperature and lithium/sodium ratio, densities in excess of 2.9 g/cc can be obtained. At a normal operating density of 2.85g/cc, the viscosity is less than 12 cP, comparable to TBE which has a viscosity of 10 cP. In addition, the LST dense liquids are stable to heating up to 100 degrees Celsius, and so can be concentrated or recycled by boiling off the water, with little or no loss of LST.

The solutions of LST are not significantly corrosive to the metals commonly encountered in the laboratory, nor to most minerals. This is an important advantage over using the free acid (alpha-tungstosilicic acid) which also forms dense solutions, but which is very acidic and hence corrosive. Another advantage of LST over the free acid is that the free acid is not so stable, and slowly decomposes, depositing insoluble, yellow hydrated $WO_3$.

A feature of LST is that it is soluble in both water and a number of common organic solvents such as ethanol and acetone. This allows organic solvents to be used to wash the LST free from the minerals, if desired. Sodium polytungstate (SPT) cannot be washed free in this manner.

All of the desirable properties of a heavy liquid are present in aqueous solutions of these compounds: high density, low vapour pressure and toxicity, low viscosity, good stability, lack of colour, reasonable cost and ease of preparation/manufacture.

The uses of LST would not necessarily be limited to mineral separations, but could include any separation based on density, e.g. separation of bones and fossils from minerals.

The LST heavy liquid can be prepared by dissolving the anhydrous or hydrated crystals of LST in water at room temperature. Typically, one litre of dense liquid with S.G. 2.85 can be made by dissolving 2400 g of LST solid in 450 ml of water. The exact amount of solid will vary somewhat, depending on the amount of water of crystallisation present.

If a less dense liquid is desired, the heavy liquid so formed can be diluted with water to whatever extent necessary. To prepare a more dense solution, up to 2.95 g/cc if operating at 25 degrees Celsius, less water can be used in making the heavy liquid.

Once the heavy liquid has been formed, it can be used to separate mineral or other particles at the required density. This can be carried out in a variety of fashions, such as the following:

To 200 ml of the LST heavy liquid held in a 250 ml separating funnel is added 20 g of a cleaned and sized mineral sample. The sample is stirred in the liquid for 20 seconds, or until the sample is thoroughly wetted and mixed throughout the liquid, then the mixture is allowed to stand for 3 minutes. Once the separation is visibly complete, as can be seen from the concentration of mineral at the surface and at the bottom of the separating funnel, the lower half is drawn off and filtered through coarse filter paper.

The filtrate is collected and kept for later mineral separations. The mineral retained by the filter paper is washed with distilled water, and the washings collected.

The mineral particles collected are dried in an oven, then weighed, or examined as may be required.

The washings contain small amounts of the LST heavy liquid, so they are kept and recycled. The recycling procedure normally involves filtering the washings through a fine filter paper, then condensing the washings by heating and evaporating the water until a dense liquid is once again obtained.

The liquid and mineral sample remaining in the separating funnel is then drawn off and filtered through coarse filter paper. This sample is then treated as described in the preceding two paragraphs for the lower sample.

By weighing both the lower sample, sometimes described as the "sinks", and the upper sample, the "floats", the mineral sample being examined can be described as containing a mineral fraction with a density less than the LST heavy liquid (say, 2.85 g/cc), and a mineral fraction with a density greater than the LST heavy liquid.

The above description is one way in which a LST heavy liquid with a density of 2.85 g/cc can be used to separate heavy minerals such as zircon, rutile, ilmenite, monazite, xenotime, hematite, magnetite, diamonds and garnets, from light minerals such as quartz, feldspars, gypsum, vermiculite, clay and serpentine minerals.

Many modifications to the method of use described can be envisaged. For example, a centrifuge might be used to aid separation, or be used in the heavy liquid recycling procedure; the process might be automated; a different solvent could be used in the washing step; or, a different scale and configuration of equipment might be used.

The lithium and sodium salts may be prepared as set out in the following description.

In order to produce the most dense LST solutions, the lithium, sodium or lithium/sodium salt of the free acid (alpha-tungstosilicic acid) must be prepared at pH less than 4.0 if in concentrated form, and preferably less than 3.5, or a different species anion ($[SiW_{11}O_{39}]^{8-}$) is obtained.

The main component of LST is lithium or lithium/sodium alpha-tungstosilicate. This can be made by neutralising alpha-tungstosilicic acid with either the carbonate or the hydroxide of lithium and sodium, as described in the following paragraphs.

A dilute aqueous solution of lithium or sodium carbonate is slowly added drop-wise at room temperature to a stirred 0.1 M solution of alpha-tungstosilicic acid in water until the solution reaches pH 3.5. If the pH remains above 4.0 after equilibrium is achieved, then the LST so produced is inferior. The most probable explanation for this is that above pH 3.5 the less soluble $[SiW_{11}O_{39}]^{8-}$ species is produced. Following neutralisation, the solution is evaporated to give the LST heavy liquid.

In order to maintain the pH so that the reaction environment favours forming the $[SiW_{12}O_{40}]^{4-}$ species, the reaction can be controlled to allow a certain amount of free alpha-tungstosilicic acid to remain in the solution. 0.005% of free acid will give a pH of 4 and 2.5% of free acid will result in a pH of around 1. The preferred concentration of free acid is 0.2%.

It is clear that other basic salts of sodium or lithium could be used in place of hydroxide or carbonate; for example sodium or lithium hydrogen carbonate could be used. When preparing LST with a particular sodium/lithium ratio, the sodium and lithium hydroxide (carbonate, etc) may be added simultaneously as a mixture, or sequentially.

The parent acid, alpha-tungstosilicic acid, can be purchased commercially from speciality chemical suppliers. It can also be prepared according to literature methods, as described in the publication "Inorganic Syntheses" 27, 93, 1990.

It should be appreciated that the scope of the invention is not limited to the embodiment described herein.

We claim:

1. A stable heavy liquid for material separations, said heavy liquid comprising an aqueous solution of a lithium salt and having anionic moieties having the formula $[(a)^{n+}(b)_m O_k]^{x-}$ where (a) is selected from the following:

group IV elements group V elements transition metal elements rare earth elements;

where (b) is one or more transition metal elements having an atomic weight between 50 and 201 inclusive, where O is oxygen, where m is an integer between 6 and 18 inclusive, and where k is an integer between 24 and 62 inclusive;

wherein the pH of said solution is between 1 and 4 and wherein said heavy liquid separates heavy material components from light material components.

2. A stable dense liquid as claimed in claim 1 comprising a minor portion of a free acid form of said anionic moieties.

3. A stable dense liquid as claimed in claim 1 wherein said atomic weight is between 92 and 201 inclusive.

4. A stable dense liquid as claimed in claim 1 where (a) is silicon.

5. A stable dense liquid as claimed in claim 1 wherein (b) is one of tungsten, molybdenum, vanadium, niobium or tantalum.

6. A stable dense liquid as claimed in claim 1 wherein said anionic moieties comprise $[SiW_{12}O_{40}]^{4-}$.

7. The heavy liquid of claim 1 wherein said aqueous solution includes a sodium salt having anionic moieties having the formula $[(a)^{n+}(b)_m O_k]^{x-}$ where (a) is selected from the following:

group V elements transition metal elements rare earth elements;

where (b) is one or more transition metal elements having an atomic weight between 50 and 201 inclusive, where is oxygen, where m is an integer between 6 and 18 inclusive, and where k is an integer between 24 and 62 inclusive.

8. A stable heavy liquid for material separations, said heavy liquid comprising an aqueous solution of a salt and having anionic moieties having the formula $[(a)^{n+}(b)_m O_k]^{x-}$ where (a) is selected from the following:

group IV elements group V elements transition metal elements rare earth elements;

where (b) is one or more transition metal elements having an atomic weight between 50 and 201 inclusive, where O is oxygen, where m is an integer between 6 and 18 inclusive, and where k is an integer between 24 and 62 inclusive;

said heavy liquid also comprising in said aqueous solution cationic moieties comprising lithium or sodium values, or a mix thereof, wherein the pH of said solution is between 1 and 4 and wherein said heavy liquid separates heavy material components from light material components.

9. A stable heavy liquid as claimed in claim 8 comprising a minor portion of a free acid form of said anionic moieties.

10. A stable dense liquid as claimed in claim 8 wherein said atomic weight is between 92 and 201 inclusive.

11. A stable dense liquid as claimed in claim 8 where (a) is silicon.

12. A stable dense liquid as claimed in claim 8 wherein (b) is one of tungsten, molybdenum, vanadium, niobium or tantalum.

13. A stable dense liquid as claimed in claim 8 wherein said anionic moieties comprise $[SiW_{12}O_{40}]^{4-}$.

14. A heavy liquid as claimed in claim 8 wherein said solution comprises between 0.005% and 2.5% of a free acid in the form of said heteropoly tungsten acid and where X is silicon.

15. A heavy liquid as claimed in claim 14 wherein said solution comprises approximately 0.2% of said free acid.

16. A heavy liquid as claimed in claim 15 wherein said heteropolytungstic acid is alpha-tungstosilicic acid.

17. A heavy liquid as claimed in claim 14 wherein said heteropolytungstic acid is alpha-tungstosilicic acid.

18. The heavy liquid of claim 8 wherein said aqueous solution cationic moieties are lithium values.

19. The heavy liquid of claim 8 wherein said aqueous solution cationic moieties are sodium values.

20. The heavy liquid of claim 8 wherein said aqueous solution cationic moieties are a mixture of lithium values and sodium values.

* * * * *

UNITED STATES PATENT AND TRADEMARK OFFICE
CERTIFICATE OF CORRECTION

PATENT NO. : 5,632,382
DATED : May 27, 1997
INVENTOR(S) : Jennifer M. Patrick et al.

It is certified that error appears in the above-identified patent and that said Letters Patent is hereby corrected as shown below:

At Column 2, line 32, please delete "$[(a)^{n+}(b)_m O_k]^{x-}$" and insert --$[(a)^{n+}(b)_m O_k]^{x}$--.

At Column 3, line 16, please delete "$(X)_n^{m+}(SiW_{12}O_{40})^{4-}$" and insert --$X)_n^{m+}(SiW_{12}O_{40})^{4}$--.

At Column 7, before line 1, please insert --group IV elements--.

At Column 7, lines 6-7, please delete "where is oxygen" and insert --where O is oxygen--.

Signed and Sealed this

Ninth Day of December, 1997

Attest:

BRUCE LEHMAN

Attesting Officer

Commissioner of Patents and Trademarks